United States Patent
Kato et al.

(10) Patent No.: US 10,401,047 B2
(45) Date of Patent: Sep. 3, 2019

(54) REFRIGERATION CYCLE APPARATUS

(71) Applicant: Mitsubishi Electric Corporation, Tokyo (JP)

(72) Inventors: Yohei Kato, Tokyo (JP); Masafumi Tomita, Tokyo (JP); Shinichi Uchino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 195 days.

(21) Appl. No.: 15/314,542

(22) PCT Filed: Jun. 27, 2014

(86) PCT No.: PCT/JP2014/067165
§ 371 (c)(1),
(2) Date: Nov. 29, 2016

(87) PCT Pub. No.: WO2015/198475
PCT Pub. Date: Dec. 30, 2015

(65) Prior Publication Data
US 2017/0167762 A1 Jun. 15, 2017

(51) Int. Cl.
*F25B 13/00* (2006.01)
*F25B 41/06* (2006.01)
(Continued)

(52) U.S. Cl.
CPC .............. *F24F 11/89* (2018.01); *F25B 1/10* (2013.01); *F25B 13/00* (2013.01); *F25B 41/062* (2013.01);
(Continued)

(58) Field of Classification Search
CPC .......... F25B 2400/16; F25B 2400/0415; F25B 2600/2523; F25B 1/10; F25B 13/00;
(Continued)

(56) References Cited

U.S. PATENT DOCUMENTS 4,551,983 A * 11/1985 Atsumi .................. F25B 41/00
62/174
4,562,700 A * 1/1986 Atsumi .................. F25B 13/00
62/174
(Continued)

FOREIGN PATENT DOCUMENTS

| CN | 1208842 A | 2/1999 |
| JP | S62-069773 U | 5/1987 |

(Continued)

OTHER PUBLICATIONS

Office action dated Aug. 22, 2018 issued in corresponding CN patent application No. 201480079363.7 (and English translation thereof).
(Continued)

*Primary Examiner* — Cassey D Bauer
*Assistant Examiner* — Miguel A Diaz
(74) *Attorney, Agent, or Firm* — Posz Law Group, PLC

(57) ABSTRACT

In a refrigeration cycle apparatus, a refrigerant heat exchanger is provided within a refrigerant container, and the refrigerant heat exchanger is configured to exchange heat between refrigerant flowing through a bypass circuit and refrigerant accumulated in the refrigerant container.

10 Claims, 7 Drawing Sheets

(51) Int. Cl.
*F25B 1/10* (2006.01)
*F25B 47/02* (2006.01)
*F24F 11/89* (2018.01)
*F25B 43/00* (2006.01)
*F25B 49/02* (2006.01)

(52) U.S. Cl.
CPC ......... *F25B 43/006* (2013.01); *F25B 47/022* (2013.01); *F25B 49/02* (2013.01); *F25B 2341/0661* (2013.01); *F25B 2341/0662* (2013.01); *F25B 2400/051* (2013.01); *F25B 2400/053* (2013.01); *F25B 2400/16* (2013.01); *F25B 2400/23* (2013.01); *F25B 2600/2509* (2013.01); *F25B 2600/2513* (2013.01); *F25B 2600/2519* (2013.01); *F25B 2600/2523* (2013.01)

(58) Field of Classification Search
CPC ...... F25B 41/062; F25B 47/022; F25B 49/02; F25B 2341/0661; F25B 2341/0662; F25B 2400/051; F25B 2400/053; F25B 2400/23; F25B 2400/03; F25B 2400/13; F25B 2400/0409; F25B 2600/2509; F25B 2600/2513; F25B 2600/2519; F25B 2700/2113; F25B 43/006; F25B 2339/0446; F24F 11/89
See application file for complete search history.

(56) References Cited

U.S. PATENT DOCUMENTS

| | | | | |
|---|---|---|---|---|
| 5,136,855 A * | 8/1992 | Lenarduzzi | ............ | F24T 10/10 62/129 |
| 5,628,200 A * | 5/1997 | Pendergrass | ............ | F24F 3/06 62/197 |
| 5,987,914 A | 11/1999 | Sumida et al. | | |
| 5,996,360 A * | 12/1999 | Tanaka | ............... | B60H 1/00907 62/159 |
| 6,006,532 A * | 12/1999 | Suzuki | ................. | B60H 1/3225 62/225 |
| 10,088,206 B2 * | 10/2018 | Sakai | ..................... | F25B 13/00 |
| 2005/0081545 A1 * | 4/2005 | Gist | ..................... | F25B 41/043 62/217 |
| 2009/0019878 A1 * | 1/2009 | Gupte | ..................... | F25B 9/008 62/335 |
| 2009/0133435 A1 * | 5/2009 | Toyoshima | ........... | F25B 31/004 62/473 |
| 2009/0229285 A1 * | 9/2009 | Sato | ........................ | F25B 41/00 62/149 |
| 2010/0199707 A1 * | 8/2010 | Pearson | ................. | F25B 9/008 62/434 |
| 2010/0251761 A1 * | 10/2010 | Yoshimi | .................... | F25B 1/10 62/524 |
| 2013/0055754 A1 * | 3/2013 | Kim | ......................... | F25B 1/10 62/510 |
| 2013/0145791 A1 * | 6/2013 | Christensen | ............. | F25B 1/10 62/498 |
| 2014/0069122 A1 * | 3/2014 | Lockhart | ................ | F25B 13/00 62/56 |
| 2014/0090407 A1 * | 4/2014 | Piesker | ................ | F25B 43/006 62/119 |
| 2014/0290292 A1 * | 10/2014 | Kato | ....................... | F25B 13/00 62/190 |
| 2015/0128629 A1 * | 5/2015 | Kawano | ................. | F25B 9/002 62/160 |
| 2015/0267930 A1 * | 9/2015 | Ryu | ...................... | F24F 5/001 62/503 |
| 2015/0267949 A1 * | 9/2015 | Koppineedi | ......... | F25B 43/006 62/117 |
| 2015/0362199 A1 * | 12/2015 | Yumoto | ................. | F25B 13/00 62/228.1 |
| 2016/0216015 A1 * | 7/2016 | Sakai | ..................... | F25B 13/00 |
| 2016/0245563 A1 * | 8/2016 | Kudo | ..................... | F25B 13/00 |
| 2016/0273795 A1 * | 9/2016 | Takenaka | ................ | F24F 13/30 |
| 2017/0082333 A1 * | 3/2017 | Shimazu | .................. | F25B 6/04 |
| 2018/0222287 A1 * | 8/2018 | Mieda | ................ | B60H 1/00914 |
| 2018/0356136 A1 * | 12/2018 | Zhao | ..................... | F25B 41/062 |

FOREIGN PATENT DOCUMENTS

| | | |
|---|---|---|
| JP | H02-004162 A | 1/1990 |
| JP | 2000-274859 A | 10/2000 |
| JP | 2000-283583 A | 10/2000 |
| JP | 2000-304374 A | 11/2000 |
| JP | 2001-056159 A | 2/2001 |
| JP | 2002-318039 A | 10/2002 |
| JP | 2002318039 A * | 10/2002 |
| JP | 2005-315558 A | 11/2005 |
| JP | 2006071257 A * | 3/2006 ............... F25B 1/10 |
| JP | 2006-112753 A | 4/2006 |
| JP | 2006-138525 A | 6/2006 |
| JP | 2009-192164 A | 8/2009 |

OTHER PUBLICATIONS

International Search Report of the International Searching Authority dated Sep. 9, 2014 for the corresponding International application No. PCT/JP2014/067165 (and English translation).

Office Action dated Aug. 11, 2015 issued in corresponding JP patent application No. 2015-529956 (and English translation).

* cited by examiner

← COOLING
←-- HEATING

← HEATING AND DEFROSTING

REFRIGERATION CYCLE APPARATUS

CROSS REFERENCE TO RELATED APPLICATION

This application is a U.S. national stage application of PCT/JP2014/067165 filed on Jun. 27, 2014, the contents of which are incorporated herein by reference.

TECHNICAL FIELD

The present invention relates to a refrigeration cycle apparatus including a refrigerant container.

BACKGROUND ART

A refrigeration cycle apparatus including a receiver is hitherto known.

As such an apparatus, there is disclosed "a heat pump in which an expansion valve is arranged between an outdoor heat exchanger and a receiver, a subcooler being a unit different from the receiver is interposed between the receiver and an indoor heat exchanger, and a bypass circuit extending from a lower portion of the subcooler communicates to a heat transfer pipe of the subcooler" (see, for example, Patent Literature 1).

Further, there is described "a refrigerating and air-conditioning apparatus including: a compressor; a four-way valve; an indoor heat exchanger; a first pressure reducing device; and an outdoor heat exchanger, in which these components are connected circularly, and heat is supplied from the indoor heat exchanger, the refrigerating and air-conditioning apparatus further including: an intermediate-pressure receiver arranged between the indoor heat exchanger and the first pressure reducing device; a first internal heat exchanger that exchanges heat between refrigerant in the intermediate-pressure receiver and refrigerant between the outdoor heat exchanger and the compressor; and an injection circuit in which part of refrigerant between the indoor heat exchanger and the first pressure reducing device is bypassed and is injected into a compression chamber in the compressor, the injection circuit including: a second pressure reducing device; a second internal heat exchanger that exchanges heat between refrigerant decompressed by the second pressure reducing device and the refrigerant between the indoor heat exchanger and the first pressure reducing device; and a heat source for heating refrigerant, arranged in the injection circuit between the second internal heat exchanger and the compressor" (see, for example, Patent Literature 2).

CITATION LIST

Patent Literature

Patent Literature 1: Japanese Unexamined Patent Application Publication No. 2000-283583 (see paragraphs [0015] to [0021], etc.)

Patent Literature 2: Japanese Unexamined Patent Application Publication No. 2006-112753 (see FIG. 1, etc.)

SUMMARY OF INVENTION

Technical Problem

In a technology as that disclosed in Patent Literature 1, a receiver and a subcooler are configured to be formed as different units. Therefore, a footprint increases and costs increase.

In FIG. 1 to FIG. 8 of Patent Literature 1, while an end portion of an inflow pipe from an expansion valve 45 into the receiver is arranged in an upper portion of the receiver, an end portion of an outflow pipe is arranged in a lower portion of the receiver. Therefore, when cooling and heating are switched to reverse a direction of a refrigerant flow, and the end portion of an inflow pipe 64 in the upper portion of the receiver functions as an outflow portion of refrigerant, excess refrigerant accumulates in the receiver to cause insufficiency of refrigerant.

Further, refrigerant flowing into and out of the receiver and refrigerant flowing through a heat transfer pipe 60 form counter currents, and thus, a position at which refrigerant flows into the heat transfer pipe 60 is required to be lower than the end portion of an inflow pipe 51 of the receiver, which limits the structure.

In a technology as that described in Patent Literature 2, a second internal heat exchanger can be used only in any one of cooling and heating, and conditions of use thereof are set.

Further, the second internal heat exchanger is arranged separately from a refrigerant container, and thus, there are problems such as an increased component count and difficulty in securing the footprint.

Further, saturated liquid is cooled in the second internal heat exchanger, and thus, a quality at an inlet of an evaporator is considerably lowered to increase an amount of refrigerant in the evaporator compared with a case in which the second internal heat exchanger is not included.

The present invention has been made to solve the problems described above, and an object of the present invention is to provide a refrigeration cycle apparatus including a refrigerant container, which is capable of improving cycle efficiency, reducing costs, and saving space.

Solution to Problem

According to one embodiment of the present invention, there is provided a refrigeration cycle apparatus including a refrigerant circuit configured by connecting a compressor, a refrigerant flow switching device, a first heat exchanger, a first pressure reducing device, a refrigerant container, a second pressure reducing device, and a second heat exchanger by a pipe, and a bypass circuit configured to guide at least part of refrigerant accumulated in the refrigerant container toward a suction side of the compressor through a third pressure reducing device and a refrigerant heat exchanger, in which the refrigerant heat exchanger is provided within the refrigerant container and configured to exchange heat between refrigerant flowing through the bypass circuit and refrigerant accumulated in the refrigerant container.

Advantageous Effects of Invention

According to the one embodiment of the present invention, in the refrigeration cycle apparatus, through bypassing part of the refrigerant accumulated in the refrigerant container, a flow rate of refrigerant flowing on a low-pressure side reduces, and thus, pressure loss on the low-pressure side can be suppressed to improve cycle efficiency. Further, according to the one embodiment of the present invention, in the refrigeration cycle apparatus, the refrigerant heat exchanger is provided within the refrigerant container, and thus, space for arranging a double pipe becomes unnecessary to reduce costs and save space.

DESCRIPTION OF EMBODIMENTS

Figure 1:
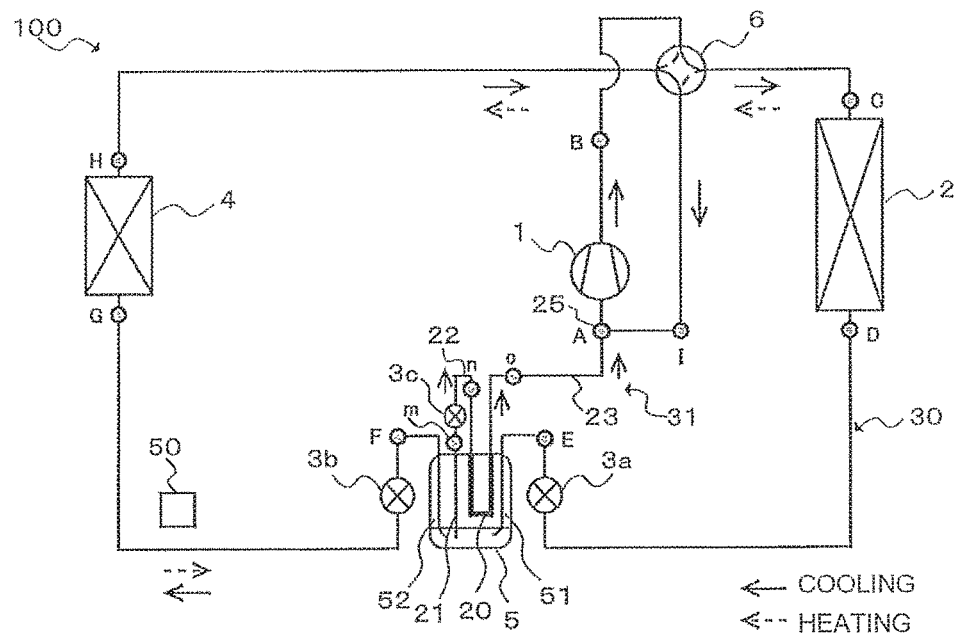
FIG. 1 is a schematic circuit diagram for illustrating an exemplary circuit configuration of a refrigeration cycle apparatus according to Embodiment 1 of the present invention.

Embodiments of the present invention are described below with reference to the drawings. In the drawings referred to below including FIG. 1, structural members are not necessarily drawn to scale. Further, in the drawings referred to below including FIG. 1, like reference numerals are used to designate like or corresponding structural members, and this applies to the entire specification. Further, geometries of structural elements referred to in the entire specification are only exemplary, and the geometries are not limited thereto.

Embodiment 1

Figure 2:
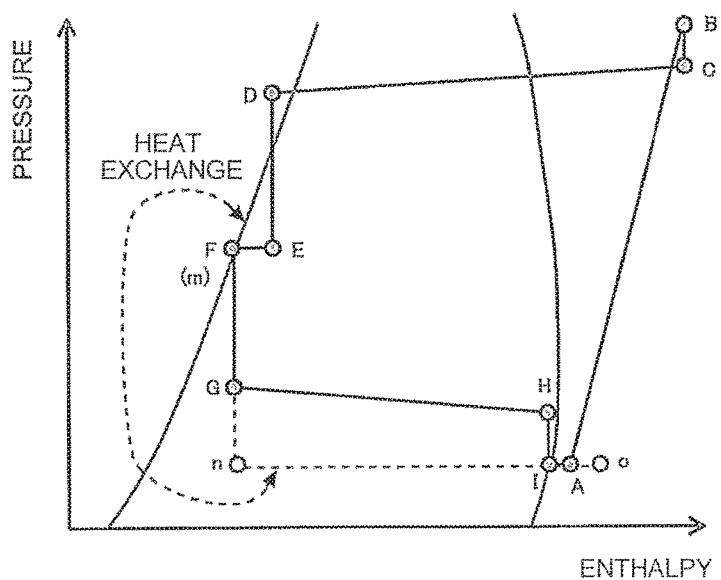
FIG. 2 is a p-h diagram in cooling operation of the refrigeration cycle apparatus according to Embodiment 1 of the present invention.

FIG. 1 is a schematic circuit diagram or illustrating an exemplary circuit configuration of a refrigeration cycle apparatus 100 according to Embodiment 1 of the present invention. FIG. 2 is a p-h diagram in cooling operation of the refrigeration cycle apparatus 100. A configuration and operation of the refrigeration cycle apparatus 100 are described with reference to FIG. 1 and FIG. 2. The refrigeration cycle apparatus 100 is installed in, for example, an ordinary house, a building, or a condominium, and is used for cooling or heating a region to be air-conditioned, e.g., a room in which the refrigeration cycle apparatus is installed through performing a vapor-compression type refrigeration cycle operation.

<Configuration of Refrigeration Cycle Apparatus 100>

The refrigeration cycle apparatus 100 includes a compressor 1, a first heat exchanger 2, an expansion valve (pressure reducing device) 3, a second heat exchanger 4, and a refrigerant container (receiver) 5, Those components are connected by a pipe to form a refrigerant circuit (hereinafter referred to as a main circuit 30). As illustrated in FIG. 1, a refrigerant flow switching device 6 may be provided on a discharge side of the compressor 1 so that a flow of refrigerant may be switched.

The compressor 1 sucks refrigerant, compresses the refrigerant into a high temperature and high pressure state, and discharges the refrigerant. The compressor 1 may be, for example, a positive displacement compressor driven by a motor, a frequency of which is controlled by an inverter.

The first heat exchanger 2 is provided on the discharge side of the compressor 1 and exchanges heat between high temperature and high pressure refrigerant supplied from the compressor 1 and a heat medium (for example, air or water) to condense and liquefy, or evaporate and gasify the refrigerant. A type of the first heat exchanger 2 is not specifically limited, but the first heat exchanger 2 may be, for example, a cross-fin-type fin and tube heat exchanger including a heat transfer pipe and a large number of fins.

There are at least two expansion valves 3, one before the refrigerant container 5, and another after the refrigerant container 5.

An expansion valve (first pressure reducing device) 3a is arranged on a downstream side of the first heat exchanger 2 that functions as a condenser, and decompresses and expands refrigerant. The expansion valve 3a may be a value having an opening degree which can be variably controlled, for example, an electronic expansion valve.

An expansion valve (second pressure reducing device) 3b is arranged on an upstream side of the second heat exchanger 4 that functions as an evaporator, and decompresses and expands refrigerant. The expansion valve 3b may be a valve having an opening degree which can be variably controlled, for example, an electronic expansion valve.

The second heat exchanger 4 is provided on a suction side of the compressor 1, and exchanges heat between low temperature, low pressure, and high pressure refrigerant supplied from the expansion valve 3 and a heat medium (for example, air or water) to evaporate and gasify, or condense and liquefy the refrigerant. A type of the second heat exchanger 4 is not specifically limited, but the second heat exchanger 4 may be, for example, a cross-fin-type fin and tube heat exchanger including a heat transfer pipe and a large number of fins.

The refrigerant flow switching device 6 switches a direction of a flow of refrigerant in heating operation and a direction of a flow of refrigerant on a heat source side in cooling operation. In cooling operation, the refrigerant flow switching device 6 makes a switch so that the discharge side of the compressor 1 and a gas side of the first heat exchanger 2 are to be connected as indicated by the solid arrows, and causes the first heat exchanger 2 to function as a condenser and causes the second heat exchanger 4 to function as an evaporator. In heating operation, the refrigerant flow switching device 6 makes a switch so that the discharge side of the compressor 1 and the second heat exchanger 4 are to be connected as indicated by the dotted arrows, and causes the first heat exchanger 2 to function as an evaporator and causes the second heat exchanger 4 to function as a condenser.

The refrigerant container 5 is arranged between the expansion valve 3a and the expansion valve 3b, and is configured to accumulate refrigerant. A pipe (first pipe) 51 and a pipe (second pipe) 52 that are communicatively connected are provided in the refrigerant container 5. The pipe 51 functions as an inflow pipe or an outflow pipe depending on the flow of refrigerant. The pipe 52 also functions as an outflow pipe or an inflow pipe depending on the flow of refrigerant. As illustrated in FIG. 1, both an end portion of the pipe 51 in the refrigerant container 5 and an end portion of the pipe 52 in the refrigerant container 5 are arranged in a lower portion of the refrigerant container 5 (side lower than a center of the refrigerant container 5).

Further, one end side of a branch pipe 21 configured to take out at least part of refrigerant accumulated in the refrigerant container 5 is provided so as to be communicatively connected in the refrigerant container 5. Another end of the branch pipe 21 is provided so as to connect refrigerant flowing out of a refrigerant heat exchanger 20 to a merging portion 25 between the second heat exchanger 4 and the compressor 1.

An expansion valve (third pressure reducing device) 3c configured to decompress refrigerant flowing out of the refrigerant container 5 is provided in the branch pipe 21.

Further, the refrigerant heat exchanger 20 configured to exchange heat between refrigerant decompressed by the expansion valve 3c and refrigerant in the refrigerant container 5 is provided in the refrigerant container 5.

The refrigeration cycle apparatus 100 includes a bypass circuit 31 configured to merge at least part of refrigerant accumulated in the refrigerant container 5 to the merging portion 25 between the second heat exchanger 4 and the compressor 1 through the branch pipe 21, the expansion valve 3c, and the refrigerant heat exchanger 20. A portion of the branch pipe 21 that connects the expansion valve 3c and the refrigerant heat exchanger 20 is referred to as a branch pipe intermediate portion 22, and a portion of the branch pipe 21 that connects the refrigerant heat exchanger 20 and the merging portion 25 is referred to as a merging pipe 23.

Further, the refrigeration cycle apparatus 100 includes a controller 50 configured to control operation of devices included in the refrigeration cycle apparatus 100. The controller 50 has a microcomputer, a memory, and other components that are provided for controlling the refrigeration cycle apparatus 100. The controller 50 is configured to be able to exchange control signals and the like with a remote control unit (not shown) for individually operating the refrigeration cycle apparatus 100.

<Operation of Refrigeration Cycle Apparatus 100>

An overview of operation of the refrigeration cycle apparatus 100 is described taking cooling operation as an example. In FIG. 1, a flow of refrigerant in cooling operation is indicated by the solid arrows. A to I (including m, n, and o) in FIG. 2 correspond to states of refrigerant at positions A to I (including m, n, and o) in FIG. 1, respectively.

(Flow of Refrigerant in Main Circuit 30)

High temperature and high pressure gas refrigerant compressed by the compressor 1 and flowing out as discharged gas (B) reaches an inlet of the first heat exchanger 2 (C) through a refrigerant pipe. The high temperature and high pressure gas refrigerant flowing into the first heat exchanger 2 is cooled in the first heat exchanger 2 into high temperature and high pressure liquid refrigerant (D) and flows into the expansion valve 3a. The refrigerant decompressed by the expansion valve 3a into intermediate pressure refrigerant flows into the refrigerant container 5 (E) from the pipe 51 of the refrigerant container 5.

In the refrigerant container 5, with the branch pipe 21, low temperature refrigerant flowing through the refrigerant heat exchanger 20 and intermediate temperature refrigerant in the refrigerant container 5 exchange heat, resulting in saturated liquid that flows out of the refrigerant container 5 through the pipe 52 (F). The refrigerant flowing out of the refrigerant container 5 is further decompressed by the expansion valve 3b and flows into the second heat exchanger 4 (G). The low temperature refrigerant flowing into the second heat exchanger 4 is heated in the second heat exchanger 4 and flows out in a state having a high quality (H). After that, the refrigerant flows into a suction portion of the compressor 1 (A) through the refrigerant pipe.

(Flow of Refrigerant in Bypass Circuit 31)

Part of refrigerant in the refrigerant container 5 flows out of the refrigerant container 5 through the branch pipe 21 (m). The refrigerant is decompressed by the expansion valve 3c into low temperature refrigerant (n). After that, the refrigerant flows into the refrigerant heat exchanger 20 provided within the refrigerant container 5, and heat is exchanged due to a temperature difference with the intermediate temperature refrigerant in the refrigerant container 5 to cause heating (o). Then, the refrigerant merges refrigerant in the main circuit 30 (I) through the merging pipe 23.

Now, the refrigerant container 5 is described in detail.

The refrigerant accumulated in the refrigerant container 5 is in a two-phase state of a liquid portion and a gas portion, that is, in a saturated state. The liquid portion accumulates at the bottom of the refrigerant container 5, and thus, an end portion of one of the pipe 51 and the pipe 52 to be an outflow pipe is arranged in a lower portion of the refrigerant container 5.

When the refrigerant container 5 is used both for cooling and heating, it is preferred to arrange the end portions of the pipe 51 and the pipe 52 in a lower portion of the refrigerant container 5 at the same level. This prevents the refrigerant accumulated in the refrigerant container 5 from further accumulating even when a necessary amount of difference in refrigerant between cooling and heating is unknown, enables normal operation, and facilitates designing.

Now, the refrigerant heat exchanger 20 is described in detail.

The refrigerant heat exchanger 20 includes a heat transfer pipe through which the refrigerant flows. As the heat transfer pipe used in the refrigerant heat exchanger 20, there may be used an ordinary circular pipe or a circular pipe that is surface treated to have protrusions thereon or the like to increase a heat transfer area or a heat transfer coefficient thereof. Further, a flattened heat transfer pipe having a large surface area may also be used.

The heat transfer pipe may be arranged so as to be stacked in a circumferential direction, or so as to be stacked in a vertical direction of the refrigerant container 5.

As described above, the refrigeration cycle apparatus 100 is provided with the bypass circuit 31, and thus, part of the refrigerant can be bypassed to the suction side of the compressor 1. Therefore, according to the refrigeration cycle apparatus 100, the flow rate of the refrigerant flowing on a low-pressure side (from the expansion valve 3 to the compressor 1) can be reduced to suppress pressure loss on the low-pressure side, thereby improving cycle efficiency.

Further, according to the refrigeration cycle apparatus 100, the refrigerant heat exchanger 20 is arranged within the refrigerant container 5, and thus, space for arranging a double pipe becomes unnecessary, which reduces costs and saves space.

Further, according to the refrigeration cycle apparatus 100, similar effects can be obtained both in cooling and heating.

Still further, according to the refrigeration cycle apparatus 100, the quality at an inlet of an expansion valve on a downstream side of the refrigerant container 5 is saturated liquid. Thus, compared with the related art, the amount of refrigerant in the evaporator is reduced, and, as a result, the amount of filling refrigerant can be small.

Even when discharge temperature increases while the refrigeration cycle apparatus 100 is operated, through bypassing the refrigerant in a liquid state to the suction side of the compressor 1, discharge temperature rise can be suppressed.

Further, when a high pressure shell is adopted as the compressor 1, the refrigerant further accumulates in refrigerating machine oil when the discharge temperature is low to reduce viscosity of the refrigerating machine oil, which causes insufficient lubrication. On the other hand, in the refrigeration cycle apparatus 100, refrigerant that is caused to become superheated gas by the refrigerant heat exchanger 20 is sucked into the suction side of the compressor 1, and thus, discharge temperature fall can be suppressed. As a result, even when refrigerant having low discharge temperature such as R1234yf or propane is used in the refrigeration cycle apparatus 100, reliability can be prevented from being lowered.

[Modified Example of Refrigeration Cycle Apparatus 100]

Figure 3:
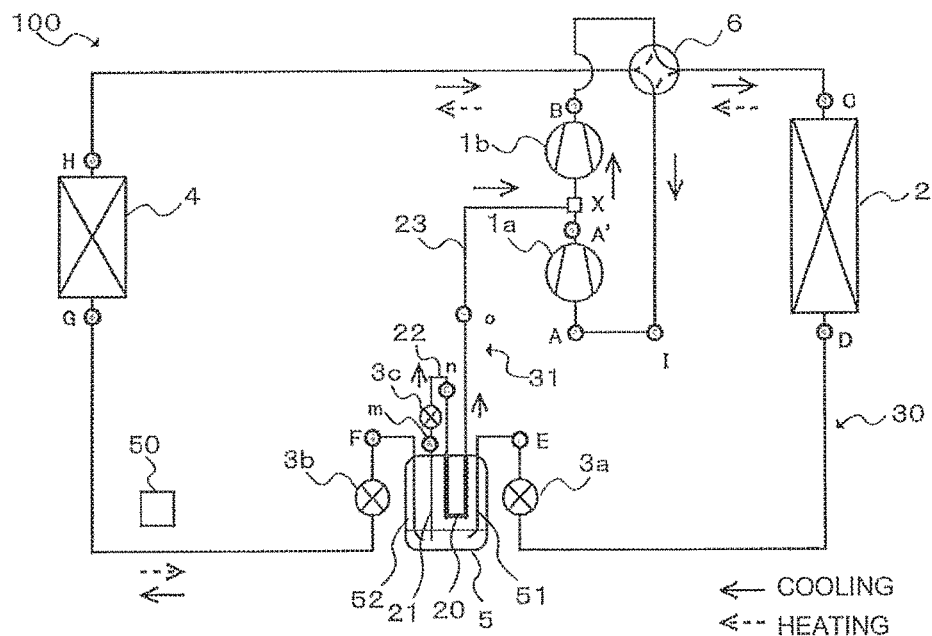
FIG. 3 is a schematic circuit diagram for illustrating another exemplary circuit configuration of the refrigeration cycle apparatus according to Embodiment 1 of the present invention.
Figure 4:
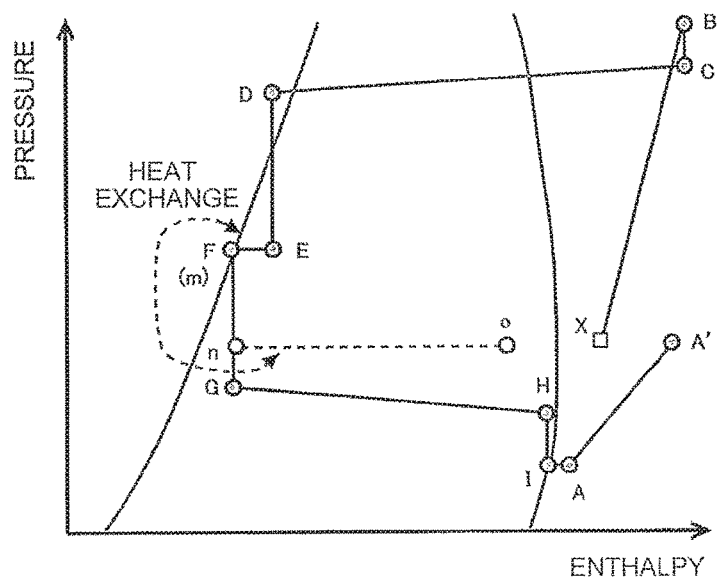
FIG. 4 is a p-h diagram in cooling operation of a modified example of the refrigeration cycle apparatus according to Embodiment 1 of the present invention.

FIG. 3 is a schematic circuit diagram for illustrating another exemplary circuit configuration of the refrigeration cycle apparatus 100. FIG. 4 is a p-h diagram in cooling operation of a modified example of the refrigeration cycle apparatus 100. The modified example of the refrigeration cycle apparatus 100 is described with reference to FIG. 3 and FIG. 4. In FIG. 3, a flow of refrigerant in cooling operation is indicated by the solid arrows. A to I (including A', X, m, n, and o) in FIG. 4 correspond to states of refrigerant at positions A to I (including A', X, m, n, and o) in FIG. 3, respectively.

<Configuration of Modified Example of Refrigeration Cycle Apparatus 100>

As illustrated in FIG. 3, in the modified example of the refrigeration cycle apparatus 100, the compressor 1 is a multistage or injection compressor, and the merging pipe 23 is connected between a low-stage-side compressor 1a and a high-stage-side compressor 1b, or is connected to an injection port of the compressor 1. Specifically, when the compressor 1 is a multistage compressor, the merging pipe 23 of the bypass circuit 31 merges a discharge side of the low-stage-side compressor 1a so that refrigerant may be sucked by the high-stage-side compressor 1b. Further, when the compressor 1 is an injection compressor, the merging pipe 23 of the bypass circuit 31 is connected to the injection port of the compressor 1 so that refrigerant may be sucked by an intermediate pressure portion of the compressor 1.

<Operation of Modified Example of Refrigeration Cycle Apparatus 100>

(Flow of Refrigerant in Main Circuit 30)

Refrigerant discharged from the low-stage-side compressor 1a (A') and refrigerant heated in the refrigerant container 5 and flowing out (o) merge (X) to be sucked by the high-stage-side compressor 1b and compressed. High temperature and high pressure gas refrigerant compressed by the high-stage-side compressor 1b and flowing out as discharged gas (B) reaches the inlet of the first heat exchanger 2 (C) through the refrigerant pipe. The high temperature and high pressure gas refrigerant flowing into the first heat exchanger 2 is cooled in the first heat exchanger 2 into high temperature and high pressure liquid refrigerant (D) and flows into the expansion valve 3a. The refrigerant decompressed by the expansion valve 3a into intermediate pressure refrigerant flows into the refrigerant container 5 (E) from the pipe 51 of the refrigerant container 5.

In the refrigerant container 5, with the branch pipe 21, the low temperature refrigerant flowing through the refrigerant heat exchanger 20 and the intermediate temperature refrigerant in the refrigerant container 5 exchange heat, resulting in saturated liquid that flows out of the refrigerant container 5 through the pipe 52 (F). The refrigerant flowing out of the refrigerant container 5 is further decompressed by the expansion valve 3b and flows into the second heat exchanger 4 (G). The low temperature refrigerant flowing into the second heat exchanger 4 is heated in the second heat exchanger 4 and flows out in a state having a high quality (H). After that, the refrigerant flows into a suction portion of the low-stage-side compressor 1a (A) through the refrigerant pipe.

(Flow of Refrigerant in Bypass Circuit 31)

Part of refrigerant in the refrigerant container 5 flows out of the refrigerant container 5 through the branch pipe 21 (m). The refrigerant is decompressed by the expansion valve 3c into low temperature refrigerant (n). After that, the refrigerant flows into the refrigerant heat exchanger 20 provided within the refrigerant container 5, and heat is exchanged due to a temperature difference with the intermediate temperature refrigerant in the refrigerant container 5 to cause heating (o). Then, the refrigerant merges refrigerant in the main circuit 30 (A) through the merging pipe 23.

Such a configuration can provide effects similar to those of the refrigeration cycle apparatus 100 described with reference to FIG. 1 and FIG. 2.

Embodiment 2

Figure 5:
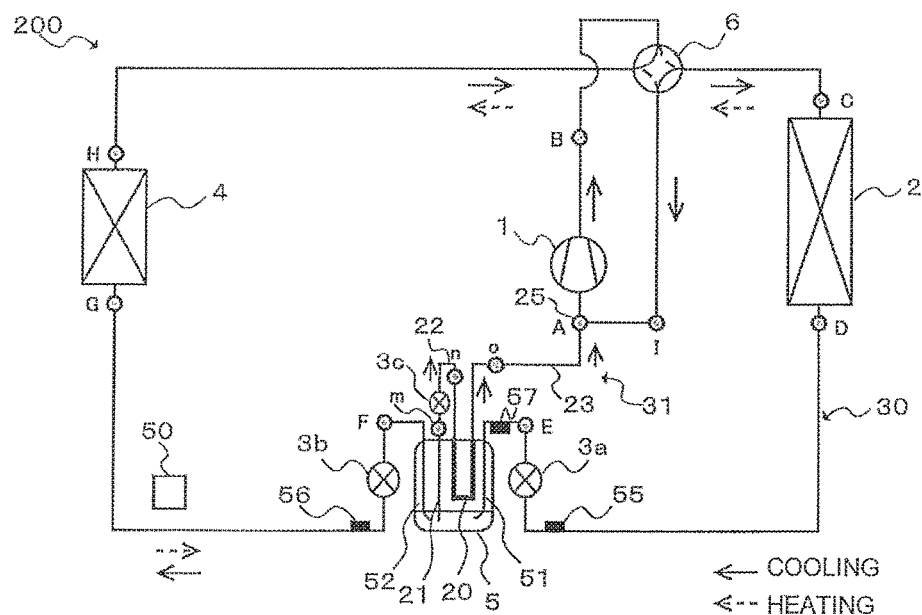
FIG. 5 is a schematic circuit diagram for illustrating an exemplary circuit configuration of a refrigeration cycle apparatus according to Embodiment 2 of the present invention.
Figure 6:
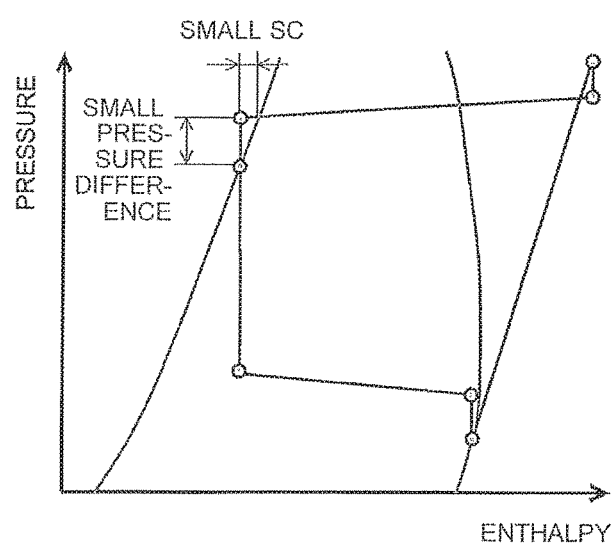
FIG. 6 is a p-h diagram in cooling operation of the refrigeration cycle apparatus according to Embodiment 2 of the present invention.
Figure 7:
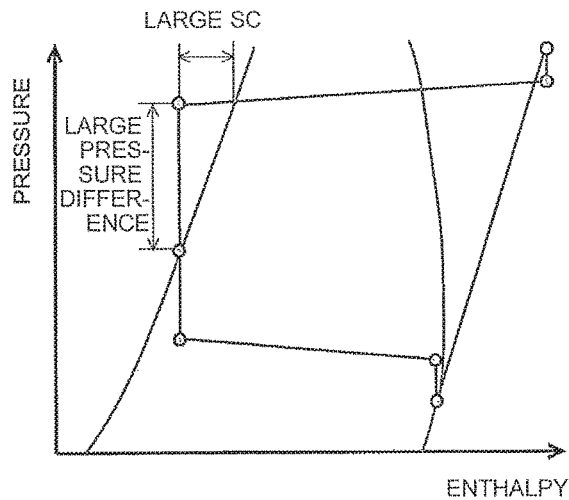
FIG. 7 is a p-h diagram in cooling operation of the refrigeration cycle apparatus according to Embodiment 2 of the present invention.

FIG. 5 is a schematic circuit diagram for illustrating an exemplary circuit configuration of a refrigeration cycle apparatus 200 according to Embodiment 2 of the present invention. FIG. 6 and FIG. 7 are p-h diagrams in cooling operation of the refrigeration cycle apparatus 200. The refrigeration cycle apparatus 200 is described with reference to FIG. 5 to FIG. 7. In Embodiment 2, points different from Embodiment 1 are mainly described, and like reference numerals are used to designate like parts in Embodiment 1 and description thereof is omitted. Further, the modified example of Embodiment 1 is similarly applied to Embodiment 2 in a portion similar to the portion of Embodiment 1 to which the modified example is applied.

Similarly to the refrigeration cycle apparatus 100 according to Embodiment 1, the refrigeration cycle apparatus 200 is installed in, for example, a building or a condominium, and is used for cooling or heating a region to be air-conditioned in which the refrigeration cycle apparatus is installed through performing vapor-compression type refrigeration cycle operation. Further, the refrigeration cycle apparatus 200 adjusts internal pressure of the refrigerant container 5 using the expansion valve 3.

<Configuration of Refrigeration Cycle Apparatus 200>

A basic configuration of the refrigeration cycle apparatus 200 is similar to the configuration of the refrigeration cycle apparatus 100 according to Embodiment 1.

In addition, the refrigeration cycle apparatus 200 includes a first pressure sensor (high pressure detection unit) 55, a second pressure sensor (low pressure detection unit) 56, and a third pressure sensor (intermediate pressure detection unit) 57.

The first pressure sensor 55 is provided between a discharge port of the compressor 1 and an inlet of the expansion valve 3a on an upstream side of the refrigerant container 5, and is configured to detect pressure (high pressure) of refrigerant discharged from the compressor 1.

The second pressure sensor 56 is provided between an outlet of the expansion valve 3b on the downstream side of the refrigerant container 5 and suction portion of the compressor 1, and is configured to detect pressure (low pressure) of refrigerant sucked by the compressor 1.

The third pressure sensor 57 is provided between the outlet of the expansion valve 3a on the upstream side of the refrigerant container 5 and an inlet of the expansion valve 3b on the downstream side of the refrigerant container 5, and is configured to detect pressure (intermediate pressure) of refrigerant flowing between the expansion valve 3a and the expansion valve 3b.

Temperature of a two-phase portion of the pipe may be detected, and the detected temperature may be converted into pressure to be used.

Pressure information detected by the first pressure sensor 55, the second pressure sensor 56, and the third pressure sensor 57 is sent to the controller 50.

When an opening degree of the expansion valve 3a on the upstream side of the refrigerant container 5 is above a predetermined value, the controller 50 exerts control to change the current opening degree of the expansion valve 3c for the purpose of increasing a pressure difference between before and after the expansion valve 3.

<Operation of Refrigeration Cycle Apparatus 200>

(Relationship Between Opening Degree of Expansion Valve 3 and Pressure Difference)

A relationship between a flow rate of fluid and a pressure difference between before and after the expansion valve 3 is expressed as Expression (1) using a dimensionless number of a Cv value.

[Math. 1]

$$C_v = M \cdot \sqrt{\frac{G}{\Delta P}} \quad (1)$$

where M is a flow rate [gal/min], G is a specific gravity, and ΔP is a pressure difference [psi] between before and after the expansion valve 3.

The Cv value is defined as "a numeric value (dimensionless) expressed in USgal/min (1 USgal=3.785 L) of a flow rate of water at a temperature of 60 degrees F. (about 15.5 degrees C.) flowing through a valve (expansion valve) at a specific opening degree when a pressure difference is 1 lb/in² [6.895 kPa]".

In general, when a valve (expansion valve) is selected, through determining the Cv value from specifications of the fluid and comparing the Cv value with a Cv value presented by valve manufacturers, the kind and the diameter of the valve are determined. In other words, comparison of Cv values is a simplified method used in selecting a valve.

From Expression (1), when the flow rate M and the specific gravity G of the fluid and the before-and-after pressure difference ΔP are determined, the Cv value is determined.

Specifically, when the pressure difference ΔP reduces, the Cv value for attaining the same flow rate, that is, the opening degree of the expansion valve increases. However, an upper threshold is set for the opening degree of the expansion valve. When the opening degree is equal to or larger than the upper threshold, the expansion valve cannot be adequately controlled.

On the other hand, when the pressure difference ΔP increases too much, the Cv value for attaining the same flow rate reduces. However, a lower threshold is set for the opening degree of the expansion valve. When the opening degree is equal to or smaller than the lower threshold, the expansion valve cannot be adequately controlled, either.

(Pressure Difference at Expansion Valve 3 and Degree of Subcooling at Outlet of First Heat Exchanger 2)

As shown in FIG. 6, in a case in which the refrigerant heat exchanger 20 is not provided within the refrigerant container 5, when a degree of subcooling at an outlet of the first heat exchanger 2 is small, if the refrigerant container 5 is in the saturated state, the pressure difference at the expansion valve 3a on the upstream side of the refrigerant container 5 reduces, and the pressure difference at the expansion valve 3b on the downstream side of the refrigerant container 5 increases.

On the other hand, as shown in FIG. 7, in a case in which the refrigerant heat exchanger 20 is not provided within the refrigerant container 5, when the degree of subcooling at the outlet of the first heat exchanger 2 is large, if the refrigerant container 5 is in the saturated state, the pressure difference at the expansion valve 3a on the upstream side of the refrigerant container 5 increases, and the pressure difference at the expansion valve 3b on the downstream side of the refrigerant container 5 reduces.

In this way, the intermediate pressure, that is, the pressure in the refrigerant container 5 varies depending on the degree of subcooling at the outlet of the first heat exchanger 2, and affects the pressure difference at the expansion valve 3.

(Securing of Pressure Difference at Expansion Valve 3 by Refrigeration Cycle Apparatus 200)

Even when the degree of subcooling at the outlet of the first heat exchanger 2 is small, through adjusting the amount of heat exchanged in the refrigerant heat exchanger 20, the intermediate pressure can be reduced. Specifically, when the amount of heat exchanged in the refrigerant heat exchanger 20 increases, the intermediate pressure reduces, and when the amount of exchanged heat reduces, the intermediate pressure increases. Therefore, in the refrigeration cycle apparatus 200, the amount of heat exchanged in the refrigerant heat exchanger 20 within the refrigerant container 5 is adjusted through controlling the opening degree of the expansion valve 3c.

<Flow of Control Processing of Expansion Valve 3>

Figure 8:
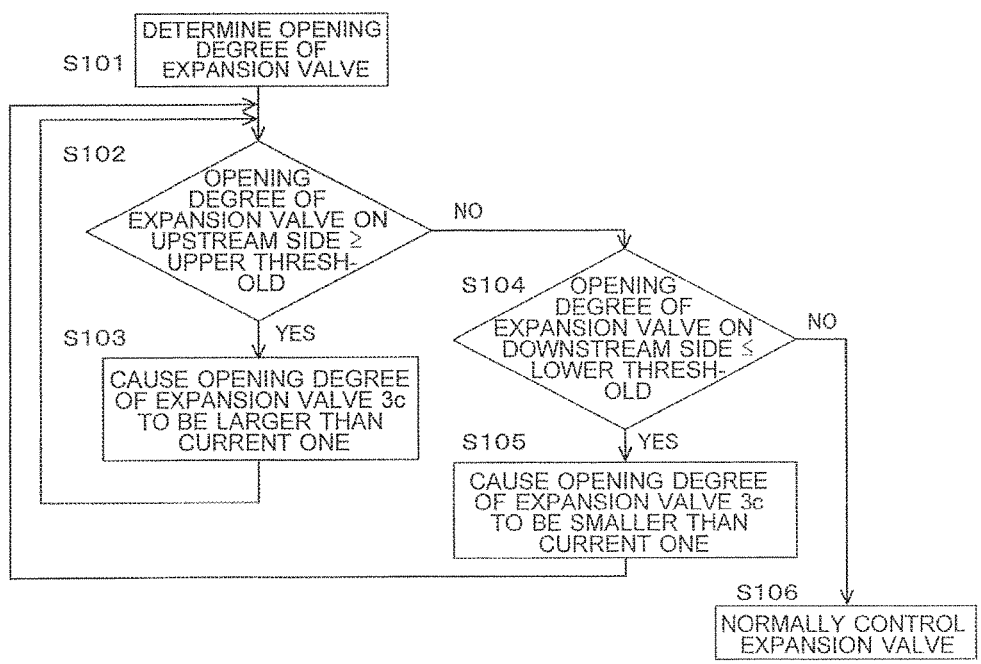
FIG. 8 is a flow chart for illustrating a flow of control processing of an expansion valve 3 executed by the refrigeration cycle apparatus according to Embodiment 2 of the present invention.
Figure 9:
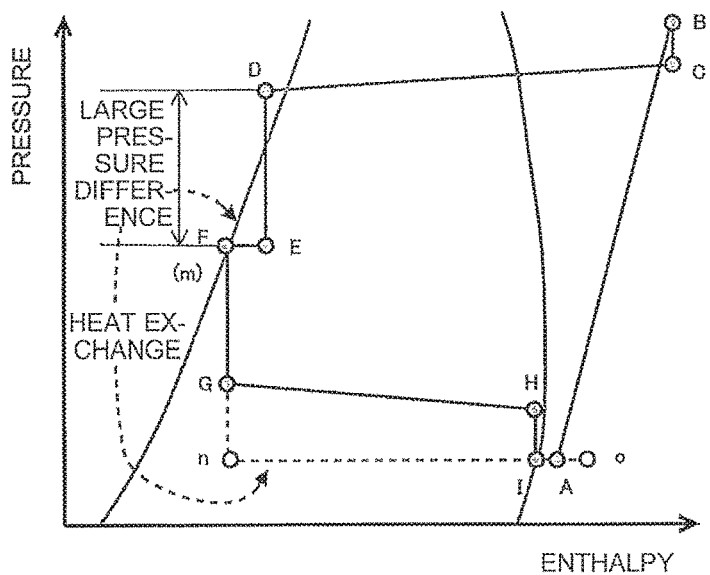
FIG. 9 is a p-h diagram in cooling operation of the refrigeration cycle apparatus according to Embodiment 2 of the present invention.

FIG. 8 is a flow chart for illustrating a flow of control processing of the expansion valve 3 executed by the refrigeration cycle apparatus 200. FIG. 9 is a p-h diagram in cooling operation of the refrigeration cycle apparatus 200. The flow of control processing of the expansion valve 3 executed by the refrigeration cycle apparatus 200 is described with reference to FIG. 8 and FIG. 9.

The controller 50 determines the opening degree of the expansion valve 3 (Step S101). Specifically, the controller 50 starts to determine the upper threshold and the lower threshold of the opening degree of the expansion valve 3 when the opening degree is determined by normal control of the expansion valve 3.

The controller 50 determines whether or not the opening degree of the expansion valve 3a is equal to or larger than the upper threshold of the opening degree of the expansion valve 3a (Step S102).

When it is determined that the opening degree of the expansion valve 3a is equal to or larger than the upper threshold of the opening degree of the expansion valve 3a (YES in Step S102), the controller 50 causes the opening degree of the expansion valve 3c to be larger than the current opening degree (Step S103). In this way, as shown in FIG. 9, the pressure difference between before and after the expansion valve 3a can be caused to be larger than the current pressure difference, and the amount of heat exchanged in the refrigerant heat exchanger 20 within the refrigerant container 5 can be adjusted.

On the other hand, when it is determined that the opening degree of the expansion valve 3a is not equal to and is not larger than the upper threshold of the opening degree of the expansion valve 3a (NO in Step S102), the controller 50 determines whether or not the opening degree of the expansion valve 3b is equal to or smaller than the lower threshold of the opening degree of the expansion valve 3b (Step S104).

When it is determined that the opening degree of the expansion valve 3b is equal to or smaller than the lower threshold of the opening degree of the expansion valve 3b (YES in Step S104), the controller 50 causes the opening degree of the expansion valve 3c to be smaller than the current opening degree (Step S105), In this way, as shown in FIG. 9, the pressure difference between before and after the expansion valve 3b can be caused to be larger than the current pressure difference, and the amount of heat exchanged in the refrigerant heat exchanger 20 within the refrigerant container 5 can be adjusted.

When it is determined that the opening degree of the expansion valve 3b is not equal to and is not smaller than the lower threshold of the opening degree of the expansion valve 3b (NO in Step S104), the controller 50 normally controls the opening degree of the expansion valve 3 (Step S106).

As described above, the refrigeration cycle apparatus 200 can adjust the amount of heat exchanged in the refrigerant heat exchanger 20 within the refrigerant container 5 with the expansion valve 3c. Therefore, according to the refrigeration cycle apparatus 200, not only can effects similar to those of the refrigeration cycle apparatus 100 according to Embodiment 1 be provided, but also the pressure difference between before and after the expansion valve 3a and the pressure difference between before and after the expansion valve 3b can be caused to be in an adequate state. Thus, controllability of the expansion valve 3 is improved, and quality of the product is improved.

<Configuration of Modified Example of Refrigeration Cycle Apparatus 200>

Figure 10:
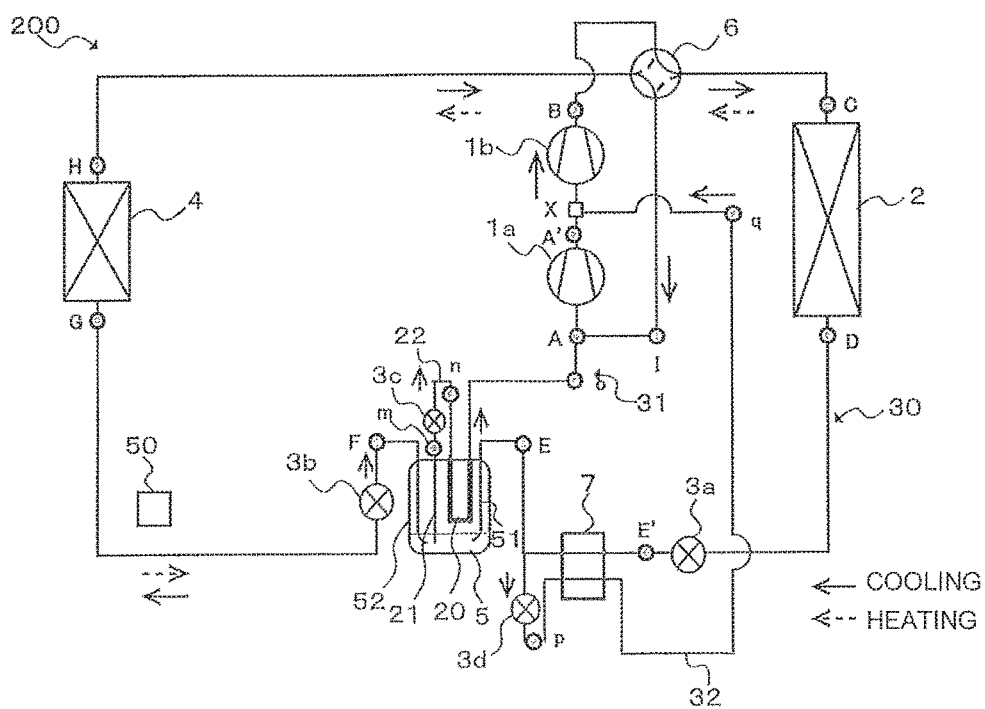
FIG. 10 is a schematic circuit diagram for illustrating another exemplary circuit configuration of the refrigeration cycle apparatus according to Embodiment 2 of the present invention.
Figure 11:
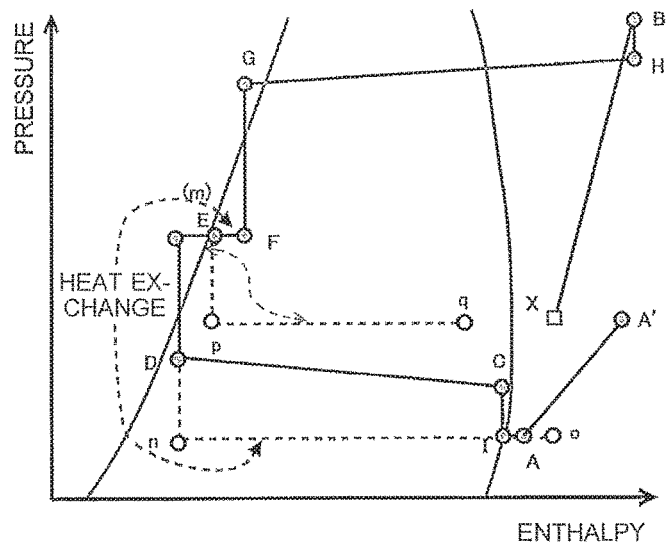
FIG. 11 is a p-h diagram in cooling operation of a modified example of the refrigeration cycle apparatus according to Embodiment 2 of the present invention.

FIG. 10 is a schematic circuit diagram for illustrating another exemplary circuit configuration of the refrigeration cycle apparatus 200. FIG. 11 is a p-h diagram in cooling operation of a modified example of the refrigeration cycle apparatus 200. The modified example of the refrigeration cycle apparatus 200 is described with reference to FIG. 10 and FIG. 11. In FIG. 10, a flow of refrigerant in heating operation is indicated by the solid arrows. A to I (including A', X, m, n, and o) in FIG. 11 correspond to states of refrigerant at positions A to I (including A', X, m, n, and o) in FIG. 10, respectively.

<Configuration of Modified Example of Refrigeration Cycle Apparatus 200>

As illustrated in FIG. 10, in the modified example of the refrigeration cycle apparatus 200, the compressor 1 is a multistage or injection compressor, and the merging pipe 23 is connected to a suction side of the low-stage-side compressor 1a. Further, an internal heat exchanger 7 is provided on an outlet side of the refrigerant container 5 (in the case illustrated in FIG. 10, on the pipe 51 side), the pipe 51 is branched between the refrigerant container 5 and the internal heat exchanger 7, and the branch is connected between the low-stage-side compressor 1a and the high-stage-side compressor 1b through an expansion valve 3d and the internal heat exchanger 7. In other words, the modified example of the refrigeration cycle apparatus 200 includes a bypass circuit 32 configured to merge at least part of the refrigerant accumulated in the refrigerant container 5 to between the low-stage-side compressor 1a and the high-stage-side compressor 1b through the pipe 51, the expansion valve (fourth pressure reducing device) 3d, and the internal heat exchanger 7.

Refrigerant flowing through the bypass circuit 32 is decompressed by the expansion valve 3d, heated in the internal heat exchanger 7, and merges the discharge side of the low-stage-side compressor 1a.

An opening degree of the expansion valve 3d is controlled so that the amount of heat exchanged in the internal heat exchanger 7 may be large and so that the pressure in the refrigerant container 5 may be high.

<Operation of Modified Example of Refrigeration Cycle Apparatus 200>

Refrigerant discharged from the low-stage-side compressor 1a (A') and refrigerant (q) heated in the internal heat exchanger 7 merge (X) to be sucked by the high-stage-side compressor 1b and compressed. High temperature and high pressure gas refrigerant compressed by the high-stage-side compressor 1b and flowing out as discharged gas (B) reaches an inlet of the second heat exchanger 4 (H) through the refrigerant pipe. The high temperature and high pressure gas refrigerant flowing into the second heat exchanger 4 is cooled in the second heat exchanger 4 into high temperature and high pressure liquid refrigerant (G) and flows into the expansion valve 3b. The refrigerant decompressed by the expansion valve 3b into intermediate pressure refrigerant flows into the refrigerant container 5 (F) from the pipe 52 of the refrigerant container 5.

In the refrigerant container 5, with the branch pipe 21, the low temperature refrigerant flowing through the refrigerant heat exchanger 20 and the intermediate temperature refrigerant in the refrigerant container 5 exchange heat, resulting in saturated liquid that flows out of the refrigerant container 5 through the pipe 51 (E). The refrigerant flowing out of the refrigerant container 5 (E) branches into the bypass circuit 32 and the main circuit 30. The liquid refrigerant flowing into the bypass circuit 32 is decompressed by the expansion valve 3d and is heated in the internal heat exchanger 7 (q), and then merges (X) the discharge side of the low-stage-side compressor 1a (A') and is sucked by the high-stage-side compressor 1b. In the case of an injection compressor, the refrigerant heated in the internal heat exchanger (q) flows into the injection port.

As described above, the modified example of the refrigeration cycle apparatus 200 increases the pressure in the refrigerant container 5 through adjusting the expansion valve 3d while the opening degree of the expansion valve on the upstream side (in FIG. 10, expansion valve 3b) does not reach the upper threshold. With this configuration, in the modified example of the refrigeration cycle apparatus 200, a temperature difference between the liquid side (E) and a gas side (p) of the internal heat exchanger 7 increases, and the amount of exchanged heat also increases. As a result, according to the modified example of the refrigeration cycle apparatus 200, when a degree of superheat of the discharged refrigerant (B) is the same, the amount of bypassed refrigerant increases to improve heating capacity compared with a case without the refrigerant heat exchanger 20.

Embodiment 3

Figure 12:
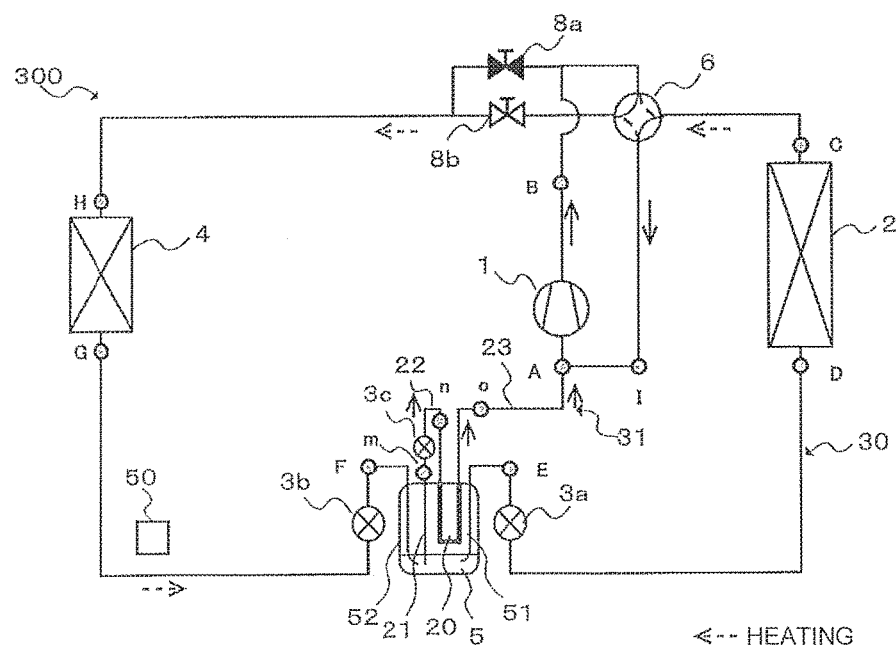
FIG. 12 is a schematic circuit diagram for illustrating an exemplary circuit configuration of a refrigeration cycle apparatus according to Embodiment 3 of the present invention, and for illustrating a flow of refrigerant in heating operation.
Figure 13:
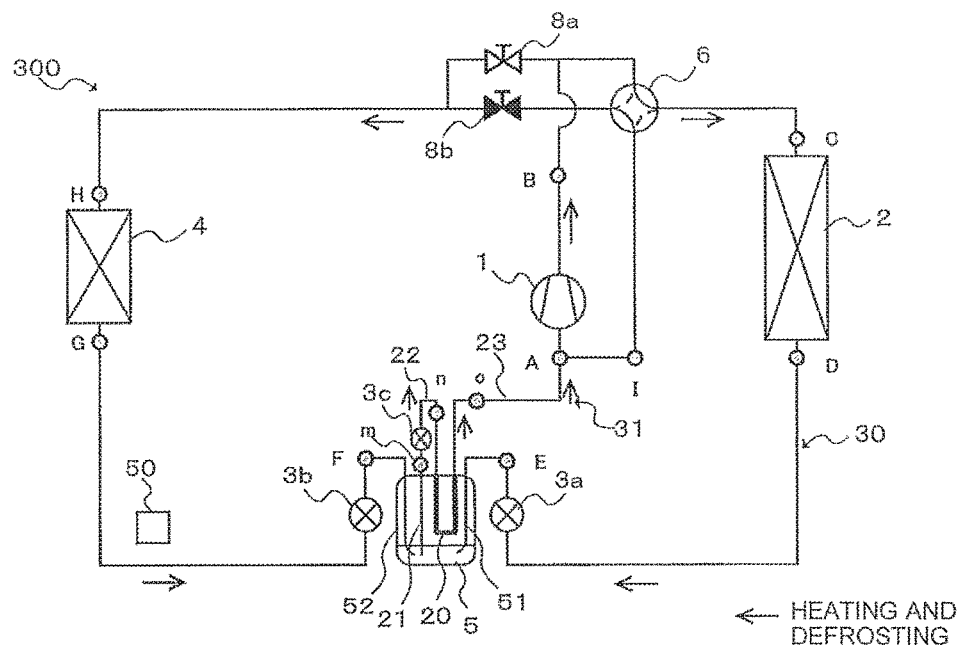
FIG. 13 is a schematic circuit diagram for illustrating the exemplary circuit configuration of the refrigeration cycle apparatus according to Embodiment 3 of the present invention, and for illustrating a flow of refrigerant in heating and defrosting operation.

FIG. 12 is an illustration of an exemplary circuit configuration of a refrigeration cycle apparatus 300 according to Embodiment 3 of the present invention, and is a schematic circuit diagram for illustrating a flow of refrigerant in heating operation. FIG. 13 is an illustration of the exemplary circuit configuration of the refrigeration cycle apparatus 300, and is a schematic circuit diagram for illustrating a flow of refrigerant in heating and defrosting operation. The refrigeration cycle apparatus 300 is described with reference to FIG. 12 and FIG. 13. In Embodiment 3, points different from Embodiments 1 and 2 are mainly described, and like reference numerals are used to designate like parts in Embodiments 1 and 2 and description thereof is omitted. Further, the modified examples of Embodiments 1 and 2 are similarly applied to Embodiment 3 in a portion similar to the portion of Embodiments 1 and 2 to which the modified example is applied.

Similarly to the refrigeration cycle apparatus 100 according to Embodiment 1, the refrigeration cycle apparatus 300 is installed in, for example, a building or a condominium, and is used for cooling or heating a region to be air-conditioned in which the refrigeration cycle apparatus is installed through performing a vapor-compression type refrigeration cycle operation. Further, the refrigeration cycle apparatus 300 includes a refrigerant circuit enabling a continuous heating operation.

<Configuration of Refrigeration Cycle Apparatus 300>

A basic configuration of the refrigeration cycle apparatus 300 is similar to the configuration of the refrigeration cycle apparatus 100 according to Embodiment 1.

In addition, the refrigeration cycle apparatus 300 includes an on/off valve (first on/off valve) 8a between the discharge side of the compressor 1 and the second heat exchanger 4, and an on/off valve (second on/off valve) 8b between the refrigerant flow switching device 6 and the second heat exchanger 4.

The on/off valve 8a and the on/off valve 8b are controlled to be opened or closed, thereby allowing or not allowing the refrigerant to flow therethrough.

<Operation of Refrigeration Cycle Apparatus 300>

(Flow of Refrigerant in Normal Heating Operation)

In normal heating operation of the refrigeration cycle apparatus 300, the on/off valve 8a is closed and the on/off valve 8b is opened. This causes high temperature and high pressure gas refrigerant compressed by the compressor 1 and flowing out as the discharged gas (B) to flow through the refrigerant pipe and through the refrigerant flow switching device 6 and the on/off valve 8b to reach the inlet of the second heat exchanger 4 (H). The high temperature and high pressure gas refrigerant flowing into the second heat exchanger 4 is cooled in the second heat exchanger 4 into high temperature and high pressure liquid refrigerant (G) and flows into the expansion valve 3b. The refrigerant decompressed by the expansion valve 3b into intermediate pressure refrigerant flows from the pipe 52 of the refrigerant container 5 into the refrigerant container 5 (F).

In the refrigerant container 5, with the branch pipe 21, the low temperature refrigerant flowing through the refrigerant heat exchanger 20 and the intermediate temperature refrigerant in the refrigerant container 5 exchange heat, resulting in saturated liquid that flows out of the refrigerant container 5 through the pipe 51 (E). The refrigerant flowing out of the refrigerant container 5 is further decompressed by the expansion valve 3a and flows into the first heat exchanger 2 (D). The low temperature refrigerant flowing into the first heat exchanger 2 is heated in the first heat exchanger 2 and flows out in a state having a high quality (C). After that, the refrigerant flows into a suction portion of the compressor 1 (A) through the refrigerant pipe.

High temperature and high pressure gas refrigerant compressed by the compressor 1 and flowing out as the discharged gas (B) reaches the inlet of the first heat exchanger 2 (C) through the refrigerant pipe. The high temperature and high pressure gas refrigerant flowing into the first heat exchanger 2 is cooled in the first heat exchanger 2 into high temperature and high pressure liquid refrigerant (D) and flows into the expansion valve 3a. The refrigerant decompressed by the expansion valve 3a into intermediate pressure refrigerant flows into the refrigerant container 5 (E) from the pipe 51 of the refrigerant container 5.

In the refrigerant container 5, with the branch pipe 21, the low temperature refrigerant flowing through the refrigerant heat exchanger 20 and the intermediate temperature refrigerant in the refrigerant container 5 exchange heat, resulting in saturated liquid that flows out of the refrigerant container 5 through the pipe 52 (F). The refrigerant flowing out of the refrigerant container 5 is further decompressed by the expansion valve 3b and flows into the second heat exchanger 4 (G). The low temperature refrigerant flowing into the second heat exchanger 4 is heated in the second heat exchanger 4 and flows out in a state having a high quality (H). After that, the refrigerant flows into a suction portion of the compressor 1 (A) through the refrigerant pipe. A flow of the refrigerant through the bypass circuit 31 is as described in Embodiment 1.

(Flow of Refrigerant in Heating and Defrosting Operation)

When heating operation is performed when outside air temperature is low, a surface of a fin forming the first heat exchanger 2 configured to exchange heat with outside air may become frosted. Frosting occludes space between fins. As space between fins is occluded, air volume gradually reduces. When the air volume reduces, the heating capacity is considerably lowered. Therefore, operation for melting the frost (defrosting operation) is necessary.

In heating and defrosting operation of the refrigeration cycle apparatus 300, the on/off valve 8a is opened and the on/off valve 8b is closed. This causes high temperature and high pressure gas refrigerant compressed by the compressor 1 and flowing out as the discharged gas (B) to flow through the refrigerant pipe to be branched into refrigerant flowing into the on/off valve 8a and refrigerant flowing into the first heat exchanger 2.

The refrigerant flowing into the on/off valve 8a transfers heat in the second heat exchanger 4 and is used as a heat source for heating.

On the other hand, the refrigerant flowing into the first heat exchanger 2 is used as a heat source for melting frost attached to the first heat exchanger 2.

The refrigerant flowing out of each heat exchanger flows into the refrigerant container 5 and merges. The refrigerant flows through the branch pipe 21, and is decompressed by the expansion valve 3c. Then, the refrigerant is heated in the refrigerant heat exchanger 20 and merges the suction side of the compressor 1.

Figure 14:
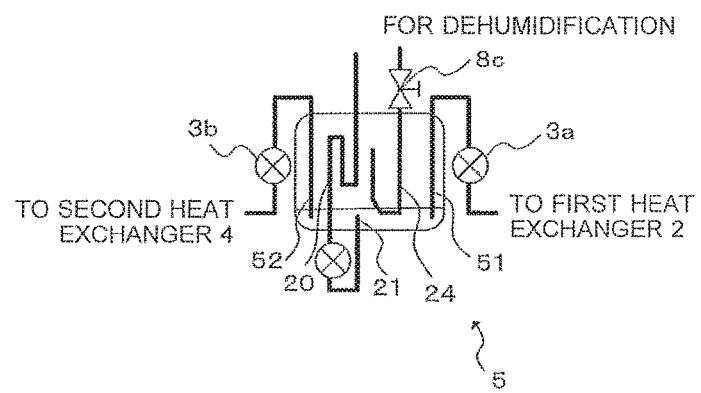
FIG. 14 is a schematic configuration diagram for illustrating an exemplary configuration of a refrigerant container.

FIG. 14 is a schematic configuration diagram for illustrating an exemplary configuration of the refrigerant container 5. The refrigerant container 5 may have the configuration as illustrated in FIG. 14. Specifically, a gas return pipe 24 communicatively connected to the inside of the refrigerant container 5 is provided in the refrigerant container 5, an on/off valve (third on/off valve) 8c is provided in the gas return pipe 24, and one end of the gas return pipe 24 is connected by a pipe to the suction side of the compressor 1. The gas return pipe 24 may have a configuration similar to that of, for example, a U-tube provided in an ordinary accumulator.

As described above, the refrigeration cycle apparatus 300 includes the on/off valve 8a and the on/off valve 8b, and thus, defrosting operation can be performed while heating operation is continued. Therefore, according to the refrigeration cycle apparatus 300, it is not necessary to stop heating operation when defrosting operation is performed, and thus, comfort is improved. Further, in the refrigeration cycle apparatus 300, refrigerant is accumulated in the refrigerant container 5, and thus, backflow of liquid to the compressor 1 can be suppressed. Therefore, according to the refrigeration cycle apparatus 300, lowering of reliability can be suppressed.

Further, the refrigerant container 5 has the configuration illustrated in FIG. 14, and thus, gas refrigerant or refrigerant having a high quality can be sucked by the compressor 1. Therefore, according to the refrigeration cycle apparatus 300 including the refrigerant container 5 that has the configuration illustrated in FIG. 14, excess backflow of liquid to the compressor 1 can be suppressed with further efficiency.

The features of the present invention are described above separately in the embodiments, but the specific configuration is not limited to those embodiments and may be modified within the range not deviating from the spirit of the present invention. Further, features of each embodiment may be appropriately combined in accordance with the application and purposes. Further, as described above, refrigerant used in the refrigeration cycle apparatus according to the embodiments is not specifically limited. Other than the exemplary refrigerants, for example, natural refrigerants (such as carbon dioxide ($CO_2$), hydrocarbon, and helium), alternative refrigerants that do not contain chlorine (such as HFC410A, HFC407C, and HFC404A), and CFC-based refrigerants used in existing products (such as R22 and R134a) can be used.

REFERENCE SIGNS LIST compressor 1a low-stage-side compressor 1b high-stage-side compressor 2 first heat exchanger 3 expansion valve 3a expansion valve 3b expansion valve 3c expansion valve 3d expansion valve 4 second heat exchanger 5 refrigerant container 6 refrigerant flow switching device 7 internal heat exchanger 8a on/off valve 8b on/off valve 20 refrigerant heat exchanger 21 branch pipe 22 branch pipe intermediate portion 23 merging pipe 24 gas return pipe 25 merging portion 30 main circuit 31 bypass circuit 32 bypass circuit 50 controller 51 pipe 52 pipe 55 first pressure sensor 56 second pressure sensor 57 third pressure sensor 100 refrigeration cycle apparatus 200 refrigeration cycle apparatus 300 refrigeration cycle apparatus

The invention claimed is:

1. A refrigeration cycle apparatus comprising:
a refrigerant circuit including a compressor, a refrigerant flow switching valve, a first heat exchanger, a first pressure reducing valve, a refrigerant container, a second pressure reducing valve, and a second heat exchanger connected by a pipe; and
a bypass guiding at least part of a refrigerant accumulated in the refrigerant container toward a suction side of the compressor through a third pressure reducing valve and a refrigerant heat exchanger, wherein
the refrigerant heat exchanger is
provided within the refrigerant container, and
configured to exchange heat between a flow of the refrigerant that circulates in the bypass and a flow of the refrigerant that is accumulated in the refrigerant container,
the third pressure reducing valve is configured to adjust an amount of heat exchanged in the refrigerant heat exchanger, and
in a case in which the first heat exchanger functions as a condenser and the second heat exchanger functions as an evaporator, when an opening degree of the first pressure reducing valve is equal to or larger than an upper threshold, the refrigeration cycle apparatus controls an opening degree of the third pressure reducing valve to be larger than a current opening degree of the third pressure reducing valve such that a pressure difference between before and after the first pressure reducing valve becomes larger than a current pressure difference between before and after the first pressure reducing valve.

2. The refrigeration cycle apparatus of claim 1, wherein the compressor includes an injection compressor.

3. The refrigeration cycle apparatus of claim 1, wherein the first pressure reducing valve and the second pressure reducing valve are configured to cause a pressure of the refrigerant accumulated in the refrigerant container to be at a pressure value that is lower than a pressure before the first pressure reducing valve and higher than a pressure after the second pressure reducing valve.

4. The refrigeration cycle apparatus of claim 1, wherein, when the opening degree of the first pressure reducing valve is not equal to and is not larger than the upper threshold, and an opening degree of the second pressure reducing valve is equal to or smaller than a lower threshold, the refrigeration cycle apparatus controls the opening degree of the third pressure reducing valve to be smaller than the current opening degree of the third pressure reducing valve such that a pressure difference between before and after the second pressure reducing valve becomes larger than a current pressure difference between before and after the second pressure reducing valve.

5. The refrigeration cycle apparatus of claim 1, wherein both an end portion of a first pipe in the refrigerant container and an end portion of a second pipe in the refrigerant container are arranged on a side lower than a center of the refrigerant container, the first pipe being configured to connect the first pressure reducing valve and the refrigerant container, and the second pipe being configured to connect the second pressure reducing valve and the refrigerant container.

6. The refrigeration cycle apparatus of claim 5, wherein levels of the end portion of the first pipe in the refrigerant container and the end portion of the second pipe in the refrigerant container are the same.

7. The refrigeration cycle apparatus of claim 1, wherein the compressor includes a low-stage-side compressor and a high-stage-side compressor.

8. The refrigeration cycle apparatus of claim 7, further comprising:
- an internal heat exchanger provided between the refrigerant container and the first pressure reducing valve; and
- a first pipe that is branched between the refrigerant container and the internal heat exchanger and is connected between the low-stage-side compressor and the high-stage-side compressor through a fourth pressure reducing valve and the internal heat exchanger.

9. The refrigeration cycle apparatus of claim 1, further comprising:
- a first on/off valve provided between a discharge side of the compressor and the second heat exchanger; and
- a second on/off valve provided between the refrigerant flow switching device and the second heat exchanger, wherein, when the first heat exchanger functions as an evaporator and the second heat exchanger functions as a condenser,
- the first on/off valve is opened and the second on/off valve is closed, and
- the refrigerant discharged from the compressor is caused to flow into both the first heat exchanger and the second heat exchanger to perform a defrosting operation of the first heat exchanger, the refrigerant from the first heat exchanger and the refrigerant from the second heat exchanger merge in the refrigerant container, and then the merged refrigerant is caused to flow to a suction side of the compressor.

10. The refrigeration cycle apparatus of claim 9, further comprising:
- a gas return pipe communicatively connected to an inside of the refrigerant container; and
- a third on/off valve provided in the gas return pipe,
- wherein one end of the gas return pipe is connected to the suction side of the compressor.

* * * * *